(12) United States Patent
Aboujaoude et al.

(10) Patent No.: US 7,286,248 B2
(45) Date of Patent: Oct. 23, 2007

(54) IMAGE FORMING SYSTEM FOR FORMING MULTIPLE IMAGES ON A PRINTING MEDIUM

(75) Inventors: Jodi F. Aboujaoude, W. Henrietta, NY (US); Roger J. Best, Rochester, NY (US); Kathleen M. Johnson, Rochester, NY (US); Govinda Kurup, W. Henrietta, NY (US); Richard H. Carr, Fairport, NY (US)

(73) Assignee: Xerox Corporation, Rochester ( * ) Notice: Subject to any disclaimer, the term of this patent is extended or adjusted under 35 U.S.C. 154(b) by 894 days.

(21) Appl. No.: 09/769,923

(22) Filed: Jan. 25, 2001

(65) Prior Publication Data

US 2002/0097435 A1 Jul. 25, 2002

(51) Int. Cl.
*G06F 15/00* (2006.01)
*H04N 1/00* (2006.01)
*G03G 15/00* (2006.01)

(52) U.S. Cl. .................. 358/1.13; 358/1.18; 358/401; 399/86

(58) Field of Classification Search ............... 358/1.1, 358/1.9, 1.11–1.18, 296, 401, 449, 450, 451; 399/79, 196, 86; 382/135, 191, 227
See application file for complete search history.

(56) References Cited

U.S. PATENT DOCUMENTS

| 5,095,369 | A | | 3/1992 | Ortiz et al. ................ 358/296 |
|---|---|---|---|---|
| 5,144,452 | A | * | 9/1992 | Abuyama .................. 358/296 |
| 5,475,475 | A | * | 12/1995 | Kohtani et al. .............. 399/79 |
| 5,490,089 | A | | 2/1996 | Smith et al. ........... 364/514 R |
| 5,621,810 | A | * | 4/1997 | Suzuki et al. .............. 382/135 |
| 5,995,722 | A | * | 11/1999 | Kishida ..................... 358/1.15 |
| 6,020,094 | A | * | 2/2000 | Arai et al. .................... 430/21 |

FOREIGN PATENT DOCUMENTS

EP 996080 A2 * 4/2000

* cited by examiner

*Primary Examiner*—Gabriel I. Garcia
*Assistant Examiner*—Thierry L. Pham
(74) *Attorney, Agent, or Firm*—Oliff & Berridge, PLC

(57) ABSTRACT

An image forming system enabling a user to submit an image, scanned or otherwise, and replicate the image to result in an output image containing repeated multiple copies of the original image on a single printing medium.

15 Claims, 5 Drawing Sheets

IMAGE FORMING SYSTEM FOR FORMING MULTIPLE IMAGES ON A PRINTING MEDIUM

FIELD OF THE INVENTION

The invention relates to an image forming system suitable for reproducing, forming, or producing an image on a printing medium, and more particularly relates to the image forming system having the capability to copy at least a portion of an image and reproduce several renditions or instances of that portion on a single printing medium.

BACKGROUND OF THE INVENTION

There are many different technologies available in current image forming systems that can scan an image, manipulate that image, and print a variety of versions of that image on a printing medium. A specific type of image forming system known as an electronic printing system, is one example system common for commercial reproduction or copying systems. An electronic printing system typically employs a combination of basic components. These components include a scanner for scanning image-containing documents, conversion electronics for converting the image to image signals or pixels, and a printer component for outputting images on a printing medium. The electronic printing system can store the image signals or pixels, in the form of image data, and subsequently read the image data successively to the printer component for formation of images on the printing medium, such as a piece of paper.

The user of such an electronic printing system often desires to scan a document or image and modify the resulting input image in a variety of ways prior to printing that input image on a printing medium. Some known varieties of image manipulation include enlargement or reduction of image size, lightening or darkening of image tone, adjustment of image contrast, adjustment of image resolution, shrink-to-fit, and black and white vs. color printing. The different methods by which the user can manipulate the resulting image allow the user to have greater creative freedom in forming a resulting image that matches predetermined criteria.

One common task in this day of modem image forming technology is the repetition of a single image on a single printing medium. Suppose, for example, that a user desires to form a document such as an advertisement that includes repeating address and telephone contact information. One method of creating such a document is to copy the contact information on multiple separate sheets of paper and cut and paste multiple blocks containing the contact information onto a single sheet. The user then copies the physically cut and paste (or taped) single sheet onto a final single sheet version containing the multiple blocks of the original image, i.e., the contact information. This process is time consuming, requires excess use of paper, and is relatively inefficient.

A user can carry out a similar process in a digital manner on a word processor in which "cut and paste" operations are built into the system software, but only if the image to be replicated can be portrayed in a compatible manner. Through trial and error, a user can reproduce a digital image the desired number of times, and attempt to fit the collection of image replications on one printed sheet. This process may require several attempts at arranging the replicate copies of the image across the page until the desired number of images properly fits on the page. However, if the image to be replicated and multiplied is not already in digital form, if the user does not have access to a word processor or other similar software package, or if some other factor precludes the above-described process, the "cut and paste" operation of the word processor will not work.

SUMMARY OF THE INVENTION

There exists in the art a need for an image forming system containing an image multiplier feature that enables a user to submit an image, scanned or otherwise, and position that image to result in an output image containing repeated multiple copies of the original image on a single printing medium, such as an output document or paper sheet. The present invention is directed toward further solutions in this art.

An image forming system includes a feature having a method of forming an image in accordance with one example embodiment of the present invention. The method includes the steps of obtaining instructions relating to image formation. This is followed by obtaining input image data relating to an input image and based at least partially on the instructions. The image forming system then forms an image comprising the input image, repeated one or more times on a single printing medium, as directed by the instructions.

The step of obtaining instructions, according to one aspect of the invention, includes the step of communicating with a user and receiving user instructions as to the formation of the image. The step of obtaining instructions can further include receiving instructions as to which specific portion of the input image is to be formed. The instructions, according to a further aspect of the invention, can contain information as to the number of replications desired.

The step of obtaining input image data can include the step of scanning at least a portion of an image to be printed. The input image data can originate from a remote device containing the original input image data.

The image forming step, according to a further aspect of the present invention, can include printing the input image in repeated fashion up to a predetermined number in concurrence with the instructions.

BRIEF DESCRIPTION OF THE DRAWINGS

The aforementioned features and advantages, and other features and aspects of the present invention, will become better understood with regard to the following description and accompanying drawings, wherein.

DETAILED DESCRIPTION OF THE INVENTION

Figure 1:
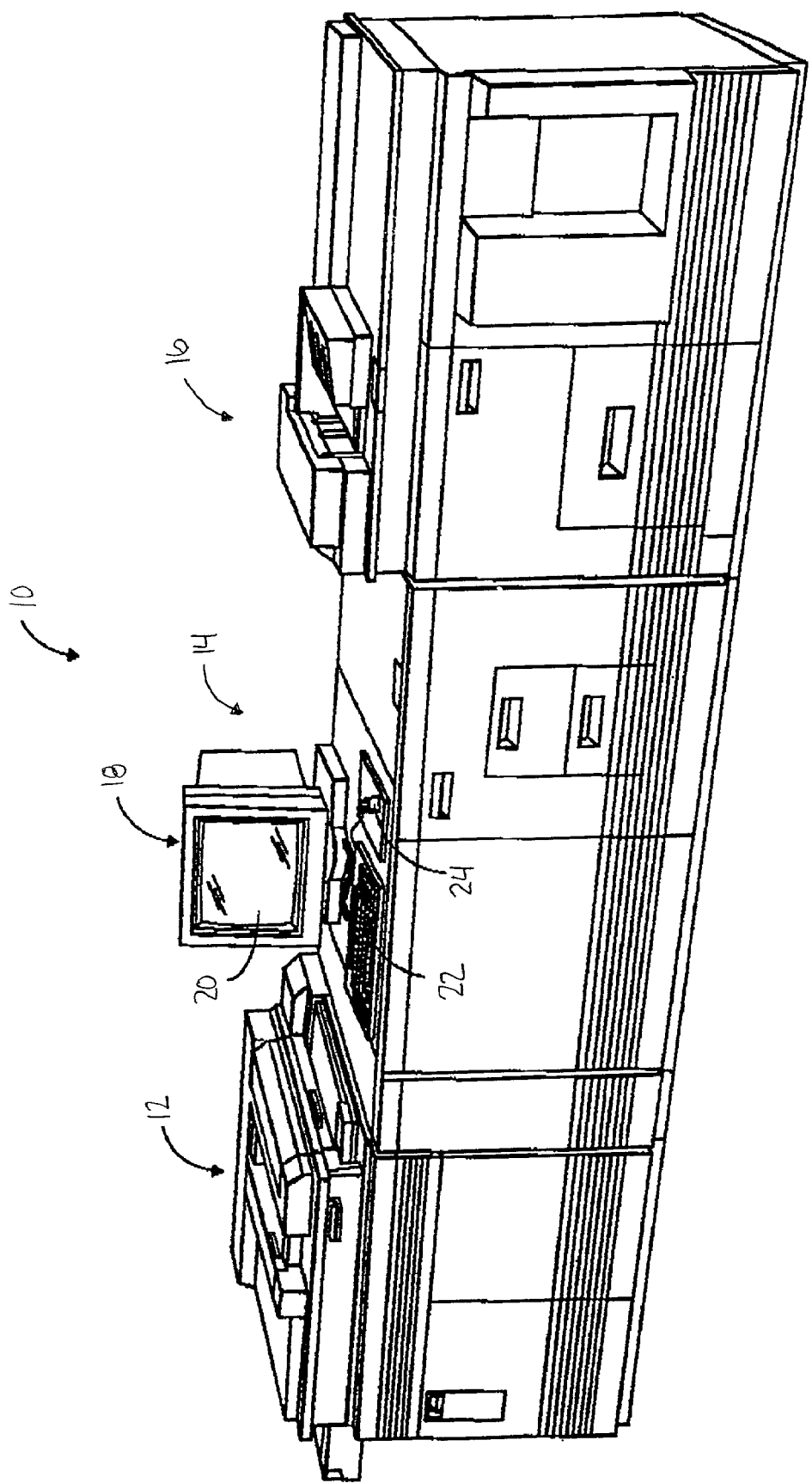
FIG. 1 is a perspective view of an image forming system according to one aspect of the present invention.

The present invention generally relates to an image forming system that includes an image multiplier feature allowing the user to copy a predetermined portion of an original document containing an image, and reproduce multiple reproductions or replications of that image, or a portion thereof, on a printing medium in a manner in compliance with user instructions. The image multiplier feature is in addition to other known features in current image forming technology. This image multiplier feature is different from a feature known to those of ordinary skill in the art as "N-Up" because it scans only a predetermined portion of an input document containing the image and places a predetermined number of copies of the image on a single output paper. Contrarily, "N-Up" scans an entire surface of the input document and reduces the image contained thereon, and the surrounding white-space, to a size enabling a fit of a predetermined number of copies on a single output paper. The term "white-space" as used herein means space on a document that does not contain an identifiable image.

FIGS. 1 through 8, wherein like parts are designated by like reference numerals throughout, illustrate an example embodiment of an image forming system according to the teachings of the present invention. Although the present invention will be described with reference to the example embodiments illustrated in the figures, it should be understood that many alternative forms can embody present invention. One of ordinary skill in the art will additionally appreciate different ways to alter the parameters of the embodiments disclosed, such as the size, shape, or type of elements or materials, in a manner still in keeping with the spirit and scope of the present invention.

FIG. 1 illustrates an example image forming system 10. Image forming systems can include a collection of different technologies, such as electrophotographic, electrostatic, electrostatographic, ionographic, acoustic, laser, ink jet, and other types of image forming or reproducing systems adapted to capture and/or store image data associated with a particular object, such as a document, and reproduce, form, or produce an image.

The illustrated image forming system 10 is an electronic printing system. The electronic printing image forming system 10 includes a scanner section 12, a controller section 14, and a printer section 16. The scanner section 12 is where image data enters the image forming system 10. The controller section 14 has a user interface 18, which includes an interactive touchscreen 20 coupled with a keyboard 22 and a mouse 24 for user input. Documents formed by the image forming system 10 exit the system in a completed format from the printer section 16.

Figure 2:
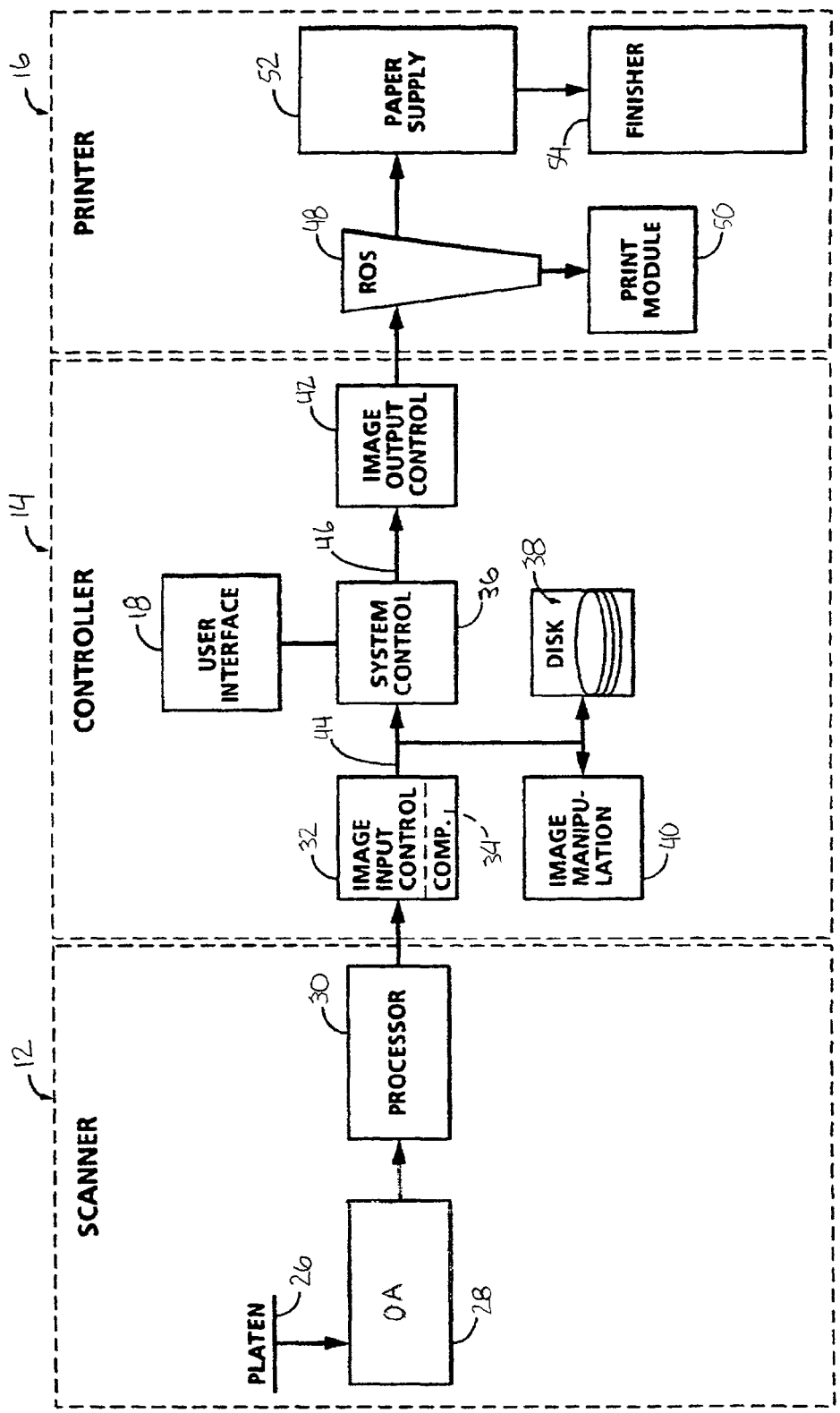
FIG. 2 is a schematic illustration of the image forming system of FIG. 1.

FIG. 2 illustrates some of the primary components that comprise the example image forming system 10. This illustration shows the scanner section 12, the controller section 14, and the printer section 16. The scanner section 12 includes a transparent platen 26 upon which a user places an input document to be scanned. An optical assembly 28 occupies a location beneath the transparent platen 26, and includes such elements as lenses and mirrors (not shown) which cooperate to focus light images reflected from the platen 26 and the document being scanned thereon. The optical assembly 28 provides image signals, or pixels representative of the image scanned, to the processor 30, which processes the image signals and provides image data to the image input controller 32. The image signals can alternatively originate from another source outside of the image forming system 10, transmitted through a wire or wireless connection to the processor 30.

The image compressor/processor 34 of the image input controller 32 compresses the input image data input as it moves from the processor 30 of the scanner section 12 to the controller section 14. The image manipulation section 40, the system controller 36, and user interface 18 work together to process the image data segmenting the data into slices N scan lines wide, each slice having a slice pointer. The compressed image data, together with slice pointers and any related image descriptors providing image specific information (such as height and width of the document in pixels, the compression method used, pointers to the compressed image data, and pointers to the image slice pointers), exist in an image file. A random access memory, or RAM, temporarily stores the image files, which represent different print jobs. The temporary storage is pending transfer to main memory 38 where the data remains pending use. A plurality of different buses, such as buses 44, and 46, connects each of the components within the controller section 14 as illustrated in FIG. 2.

User interface 18 includes the interactive touchscreen 20, and keyboard 22, and the mouse 24 (see FIG. 1). The user interface 18 interfaces with the user, enabling the user to program print jobs and other instructions, to obtain system operating information, instructions, programming information, diagnostic information, and other desired and programmed information. Items displayed on the touchscreen 20, such as data information and icons, are actuated by either touching the displayed item on the touchscreen 20, or by using the keyboard 22 or the mouse 24 to manipulate the information on the touchscreen 20 and enter the desired instructions for queries. The user can alternatively utilize other interface devices, such as joysticks, track balls, and styluses, depending on the particular image forming system.

The image data returns to main memory 38, proceeds to the user interface 18 for display on the touchscreen 20, or proceeds to the image output controller 42 for final printing, following the image processing step. The image output controller 42 decompresses the image data and processes the data for printing. The raster output scanner 48 receives the image data from the image output controller 42 and works in conjunction with the print module 50 to form desired output images on printing mediums. The printing mediums can take such form as paper found in the paper supply 52, which ultimately outputs the final printed product through the finisher 54.

Figure 3:
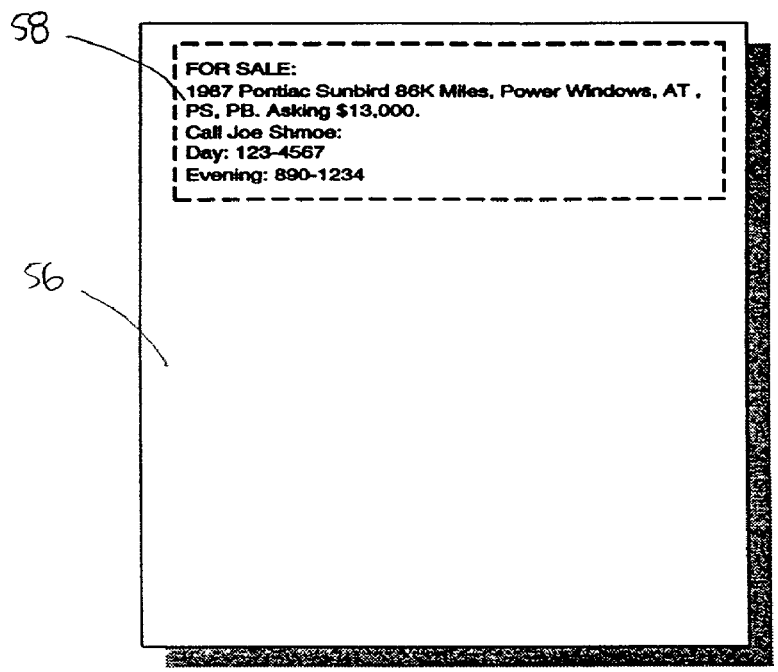
FIG. 3 is a diagrammatic illustration of an input image according to one aspect of the present invention.
Figure 4:
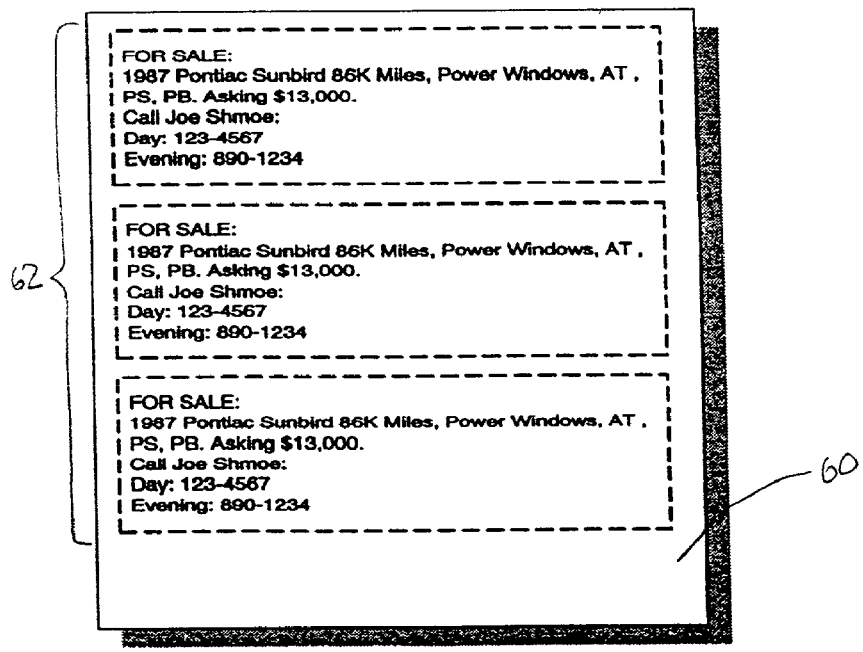
FIG. 4 is a diagrammatic illustration of an output image based on the input image of FIG. 3 according to one aspect of the present invention.

FIG. 3 illustrates an example input document 56, which contains an input image 58. The teachings of the present invention allow the user to insert the input document 56 into an image forming system 10. The user then instructs the image forming system 10 through the user interface 18 to scan the specific input image 58 on a portion of the input document 56, resulting in input image data that contains the information relating to the specific input image 58. The user interface 18 then presents the user with predetermined possible combinations, manipulations, and variations to the input image 58. FIG. 4, for example, illustrates one possible output document 60, which contains an output image 62 that comprises multiple copies of the input image 58 of the input document 56. The original input image 58, replicated three times and printed in succession on the output document 60, forms the output image 62. The illustrated system 10 hence includes an image multiplier feature for allowing the user to copy or reproduce a portion of the original input document 56 (e.g., input image 58) and fill a single sheet of paper in the form of output document 60, with same size copies of the input image 58 from the input document 56.

This image multiplier feature differs from a feature known as "N-Up," which scans the entire input document 56, including the white space underneath the input image 58, reduces the entire input document 56, and reproduces a number of shrunken images on the output document 60, making the input image 58 smaller than desired and possibly unreadable. The image forming system 10 of the present invention scans the input document 56 and determines where the actual image of the input image 58 resides on the input document 56. That specific portion of the input document 56 where the input image 58 resides forms the input image data and is the only portion that is reproduced on the subsequent output document 60. Any surrounding white-space or non-image portions of the input document 56 are not included in the resulting input image data or input image 58.

The following example further distinguishes the conventional "N-Up" feature from the image multiplier feature of the present invention. The example begins with an 8½×11-inch document containing a 2×2-inch image. The user instructs the image forming system to produce a single document with, for example, three copies of the 2×2inch image. The "N-Up" feature takes the 8½×11-inch document and reduces the entire 8½×11-inch document, including white-space surrounding the 2×2-inch image, to one-third of its original size. The 2×2-inch image, is thus reduced by one-third. The "N-Up" feature then prints three copies of the entire reduced images onto the output paper. Contrarily, the image multiplier feature of the present invention locates the 2×2 inch image in the original 8½×11-inch document and automatically scans the 2×2-inch image portion of the document, creating the input image data relating to that 2×2-inch image and not inclusive of the surrounding white-space. The image multiplier feature then determines whether the input image can fit on the output paper the number of times instructed by the user. The image multiplier, in this instance, determines that three full sized 2×2-inch images can fit on a single 8½×11-inch document. The system of the present invention therefore places three unmodified replications of the 2×2-inch image on the single output paper in the final printing.

The image multiplier feature according to the teachings of the present invention additionally enables the user to manually indicate a portion of the input document 56 to scan and replicate. The user, in such an arrangement, enters the offset distance from the beginning of the page, and the length and width of the image to scan in. The image forming system 10 then automatically fills the output document, and the output image, with the number of replications of the input image desired. This alternative overrides the otherwise utilized ability of the image forming system to scan only the image or images on a document, not necessarily the entire document (if it is comprised of significant white-spaces).

In operation, the user first selects the image multiplier feature from the user interface 18. The user enters the desired number of images per page. The user then enters the desired number of copies. The user enters "Start", or an equivalent thereof, on the control panel of the image forming system 10. If the user enters the desired number of images per page as "4", and the desired number of copies as "3", then the output is three sheets of paper with each paper bearing four unmodified images of the original input image. Any number of different combinations are possible, given the constraints of the input documents and images, and the output pages.

This image multiplier feature avoids the user having to generate three separate copies of the input image on three separate sheets of paper, cutting each of the images out of each sheet of paper, and pasting or taping the three images onto a single sheet of paper for subsequent copying onto a final single sheet of paper. Thus, excess waste of paper is avoided, and the job is completed in a more efficient manner.

Figure 5:
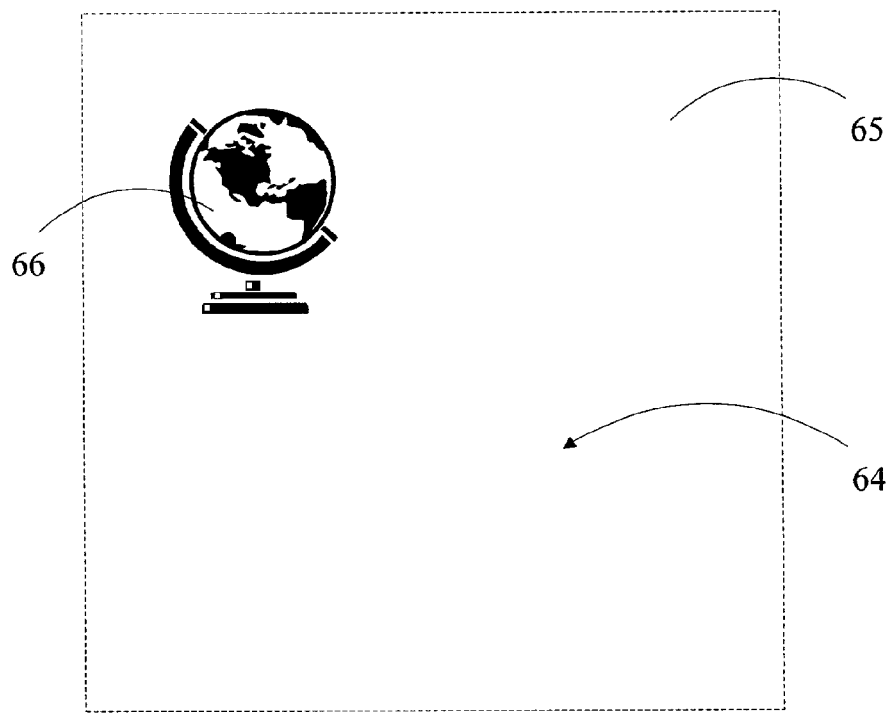
FIG. 5 is a diagrammatic illustration of another input image according to one aspect of the present invention.

FIG. 5 illustrates a different input document 64 having a different input image 66. The image, for illustrative purposes, is a globe. The input document 64 contains the image 66, as well as a significant amount of surrounding whitespace 65.

Figure 6:
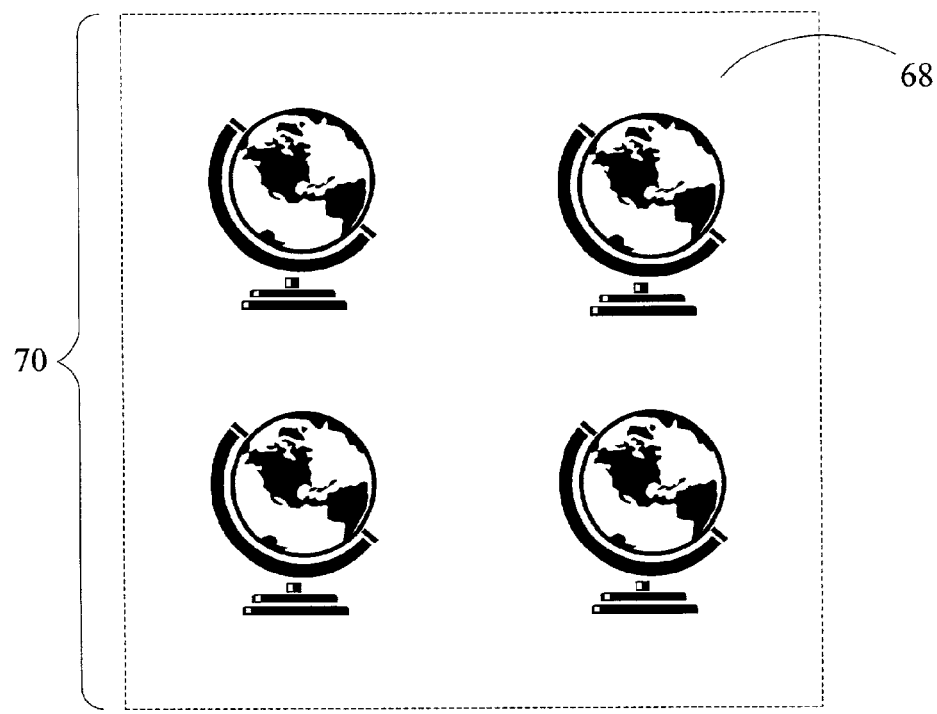
FIG. 6 is a diagrammatic illustration of an output image resulting from the input image of FIG. 5 according to one aspect of the present invention.

FIG. 6 illustrates the resulting output document 68 containing the resulting output image 70, subsequent to instructions entered by a user into the image forming system 10. The illustrated output document 68 is the result of the user requesting four reproductions of the original input image 66 to print on a single page. The four different reproductions of the input image 66 cannot fit on one side of the output document 68, therefore the user has chosen, through the user interface 18, to place each reproduction of the input image 66 in a quarter of the output document 68. The resulting output paper or document 68 therefore contains the four, unmodified, replications of the globe image 66, absent the significant white-space 65 of the original input document 64.

Figure 7:
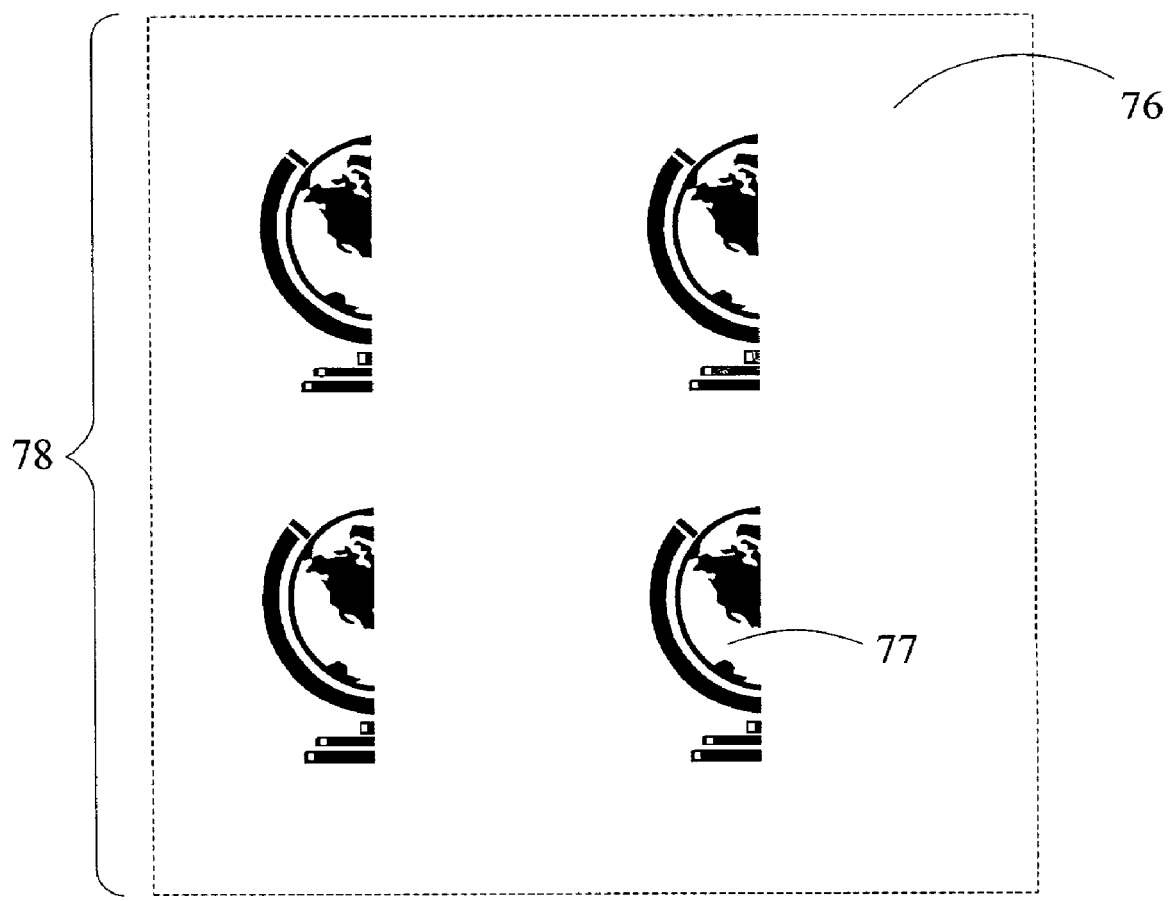
FIG. 7 is a diagrammatic illustration of yet another output image resulting from the input image of FIG. 5 according to one aspect of the present invention.

FIG. 7 illustrates still another exemplar output document 76 resulting from the input image 66 in the form of output image 78. This example illustrates how the user can chose to scan only a portion of the original input image 66 and replicate that image portion a desired number of times in the output document 76. The user, to perform this task, specifies by position on the input document 64 that portion of the input image 66 the user wants to scan and reproduce. If the user implements the automatic scanning feature, the image forming system 10 alternatively scans the entire image rather than only a portion of the image. However, the user enters dimensions sufficient to instruct the image forming system to scan approximately one-half of the original input image 66. This half-input-image 77 then repeats four times, in this example, to form the desired output document 76.

Some additional enhancements are contemplated by the teachings of the present invention. The user, for example, can specify an offset for the start of the image within the image slot on the input document. The user can also specify the portion of the page to scan and replicate, such as illustrated in FIG. 7. An advantage to this image multiplier feature is that no ending pad is required. The user simply enters the offset distance from the beginning of the page, the length, and the width of the image to scan in. If the width is not entered, the image forming system 10 assumes the entire original width.

Numerous modifications and alternative embodiments of the invention will be apparent to those skilled in the art in view of the foregoing description. This description, accordingly, is to be construed as illustrative only and is for the purpose of teaching those skilled in the art the best mode for carrying out the invention. Details of the structure may vary substantially without departing from the spirit of the invention, and exclusive use of all modifications that come within the scope of the appended claims is reserved. It is intended that the invention be limited only to the extent required by the appended claims and the applicable rules of law.

What is claimed is:

1. A method of forming an output image in an image forming system, comprising:
    scanning at least a portion of an input document containing image data, without a user pre-modifying the input document;
    automatically determining a location of the at least the portion of the input document containing image data within the input document;
    automatically extracting the image from the at least portion of the input document;
    automatically forming a duplicate image containing at least a specific portion of the at least the portion of the input document containing image data to exclude non-image portions of the input document;
    automatically determining dimensions of the duplicate image;
    automatically determining the number of times the duplicate image can be replicated on a single output medium based on the predetermined dimensions;
    automatically replicating the duplicate image a select number of times up to the determined number of times to form an output image on the single output medium.

2. The method of claim 1, further comprising selecting the number of times the duplicate image is replicated to form the output image on the output medium.

3. The method of claim 1, further comprising receiving user instructions to replicate only the at least the specific portion of the at least the portion of the input document.

4. A method of forming an output image in an image forming system, comprising:
    obtaining input image data relating to an original portion of an input document containing image data, without a user pre-modifying the input document and based at least partially on the instructions;
    automatically determining a location of the original portion of the input document containing image data within the input document;
    automatically extracting the image from the at least portion of the input document:
    automatically forming a duplicate image containing at least a specific portion of the original portion of the input document containing image data to exclude non-image portions of the input document;
    automatically determining the number of times the duplicate image can be replicated on a single output medium based on the determined dimensions;
    forming an output image comprising only the duplicate image replicated one or more times on a single printing medium up to the determined number of times, as directed by the instructions.

5. The method according to claim 4, wherein the obtaining instructions includes communicating with the user through a user interface and receiving user instructions to replicate only the at least the specific portion of the original portion of the input document to form the output image.

6. The method according to claim 4, wherein the obtaining instructions includes receiving instructions as to which at least specific portion of the original portion of the input document is to be replicated.

7. The method according to claim 4, wherein the obtaining instructions includes receiving instructions as to a number of times the duplicate image is to be replicated.

8. The method according to claim 4, wherein the obtaining input image data includes receiving a signal from a remote device containing the input document.

9. The method according to claim 4, wherein forming the output image includes printing the duplicate image in a repeated fashion up to the determined number of times based on the instructions.

10. The method according to claim 4, further comprising allowing the user to specify a location for the duplicate image on the single printing medium.

11. An image forming system, comprising:
    an image input stage for receiving image data corresponding to at least a portion of an input document, without a user pre-modifying the input document;
    a controller for automatically determining a location of the at least the portion of the input document containing image data, automatically extracting the image from the at least portion of the input document, automatically forming a duplicate image containing at least a specific portion of the at least the portion of the input document containing image data to exclude non-image portions of the input document, and automatically determining dimensions of the duplicate image;
    an image multiplier for automatically determining a number of times the duplicate image can be formed on a printing medium substrate based on the determined dimensions;
    a control stage for automatically selecting at least a portion of the duplicate image and replicating only the portion of the duplicate image a predetermined number of times up to the determined number to form an output image; and
    an image output stage for automatically producing the output image on the single printing medium substrate.

12. The system of claim 11, wherein the control stage comprises a user interface for selecting the predetermined number of times the duplicate image is replicated on the printing medium substrate.

13. The system of claim 11, wherein the control stage comprises a user interface for providing printing instructions.

14. The system of claim 11, wherein the control stage determines the total number of duplicate image replications that can be produced on the printing medium substrate.

15. The system of claim 11, wherein the control stage automatically calculates a maximum number of replications of the duplicate image possible for a single printing medium substrate.

* * * * *